United States Patent [19]

Abell et al.

[11] Patent Number: 5,482,236
[45] Date of Patent: Jan. 9, 1996

[54] LOCKING LEVELER

[75] Inventors: Scott T. Abell, Longmont; Matthew D. Woodbury, North Glenn, both of Colo.

[73] Assignee: Storage Technology Corporation, Louisville, Colo.

[21] Appl. No.: 172,212

[22] Filed: Dec. 23, 1993

[51] Int. Cl.⁶ .................................................. F16M 11/00
[52] U.S. Cl. ........................................ 248/188.4; 248/649
[58] Field of Search ............................... 248/649, 669, 248/677, 188.2, 188.3, 188.4, 650; 254/88, 104, 92, 98, 5 R, 89 R; 280/296, 763.1; 52/126.1

[56] References Cited

U.S. PATENT DOCUMENTS

| 3,171,632 | 3/1965 | Jines | 254/104 |
|---|---|---|---|
| 3,306,562 | 2/1967 | Bellefleur | 248/188.2 |
| 3,464,654 | 9/1969 | Kolesar | 248/188.2 X |
| 3,632,087 | 1/1972 | Phillips | 254/88 |
| 4,114,845 | 9/1978 | Weisenberger | 248/188.2 X |
| 4,436,268 | 3/1984 | Schriever | 248/188.2 X |
| 4,830,320 | 5/1989 | Bellows | 248/188.2 |
| 4,858,865 | 8/1989 | Schrepfer | 248/188.2 |

FOREIGN PATENT DOCUMENTS

| 36725 | 8/1930 | France | 248/188.2 |
|---|---|---|---|
| 2424516 | 6/1975 | Germany | 248/188.2 |
| 573352 | 2/1958 | Italy | 248/188.4 |
| 403405 | 8/1966 | Switzerland | 248/188.2 |

*Primary Examiner*—Karen J. Chotkowski
*Attorney, Agent, or Firm*—Sterne, Kessler, Goldstein & Fox

[57] ABSTRACT

A leveler for adjusting the height of a wheel above a floor. The leveler comprises a first wedge and a second wedge, each having a bottom surface, a sloped surface and a mating portion. The mating portion of each wedge has a bore extending at least partially therethrough. A mating device, such as a bolt, extends at least partially through the bores. Adjustment of the mating device allows the proximity of the sloped surfaces of the wedges to be adjusted.

9 Claims, 2 Drawing Sheets

LOCKING LEVELER

BACKGROUND OF THE INVENTION

1. Field of the Invention

The present invention relates generally to cabinet enclosures, and more particularly to a device for leveling cabinet enclosures equipped with casters or wheels.

2. Related Art

Large and/or heavy pieces of electronic, electromechanical, and electro-optical equipment are often housed in equipment enclosures. For example, large computer systems such as processors and associated data storage devices are often housed in cabinet-type enclosures. Similarly, communications and other types of electronic equipment is often stored or mounted in large enclosures called "racks."

To facilitate location and relocation of such enclosures, they are often fitted with wheels, or casters. The wheels allow an operator to push the rack into position on the floor. For equipment generating an appreciable amount of heat, the enclosure may be positioned over a vent in a raised floor environment. Once the enclosure has been properly positioned, it is often desirable to level the enclosure so that the equipment therein is maintained on a level plane or so that the enclosure is properly aligned with adjacent enclosures.

One conventional device for leveling an enclosure is a threaded leveler as illustrated in FIG. 1. This conventional leveler 100 includes a foot pad 108, a hex member 112 and a threaded member 116. The foot pad 108 provides a stable foot to rest on the floor. Hex member 112 allows a wrench to be used to screw threaded member 116 into a threaded portion of enclosure 104.

Once the equipment is rolled into place, the levelers 100 are lowered and locked into place so the enclosure rests on levelers 100 (typically four per enclosure). The operator uses a wrench to apply a torque to leveler 100 to adjust the length which it extends from the bottom of enclosure 104. In other words, leveler 100 is screwed farther into, or unscrewed farther out of, enclosure 104 to level enclosure 104.

There are several difficulties associated with using this conventional leveler 100. First, for enclosures housing heavy equipment, a large amount of torque is required to adjust the extension of leveler 100 from enclosure 104. In addition, it is often difficult for a technician to reach leveler 100 for adjustment since it is underneath enclosure 104 and a wrench must be used close to the floor.

Additionally, for vibration sensitive equipment, leveler 100 does not provide shock or vibration absorption characteristics. Any floor vibration is transmitted directly to the enclosure 104 via threaded member 116.

SUMMARY OF THE INVENTION

The present invention is directed to an adjustable leveler. The leveler includes two wedges each having a sloped surface. The wedges are positioned such that the sloped surface of the first wedge is facing the sloped surface of the second wedge. A bolt passes through holes in the wedges and is used to adjust the distance between the two wedges.

The leveler is positioned on the floor such that the two wedges are on either side of the enclosure wheel with the sloped surfaces of each wedge facing the rolling surface of the wheel. Bolt 204 is adjusted such that the wedges move closer together. As the wedges are brought together, the sloped surface of each wedge meets the rolling surface of the wheel. As the wedges are brought still closer together, the wheel moves up the sloped surfaces of the wedges. This raises the wheel, and thus raises the enclosure to which the wheel is attached.

Adjusting the spacing of the wedges adjusts the height of the wheel above the floor. Therefore, the use of one leveler for each enclosure wheel allows the height of each wheel to be adjusted independently of one another when leveling the enclosure. Similarly, adjustment of all of the levelers for an enclosure can be used to adjust the height of that enclosure with respect to adjacent enclosures.

The slope of the wedges can be altered to select the height range and sensitivity provided by the leveler. For example, a large slope could be used for applications where a wide range of adjustability is required. A small slope could be used for very heavy cabinet applications to reduce the torque required for adjustment One feature of the present invention is that the height of the wheel can easily be adjusted by turning the bolt. Because the bolt is horizontal, or parallel to the floor, can be easily accessed for adjustment. Readily available tools such as socket extensions can be used to facilitate adjustment.

A further advantage of the leveler is that it provides a larger surface area on which each point of the enclosure rests. Conventional levers sometime suffered from a single point loading problem. In other words, the relatively small footprine of the conventional leveler, coupled with a non-uniform load on the levelers, could result in tipping of the enclosure. The present invention, however, provides a larger surface area at each loading point. This minimizes the dangers associated with non-uniform weight distribution.

A further advantage of the leveler is interior space inside the enclosure does not need to be reserved for the retracted leveler. With conventional levelers, space inside the enclosure was reserved for the levelers in the retracted, or "up" position. This space can now be used for components.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE EMBODIMENTS

Figure 1:
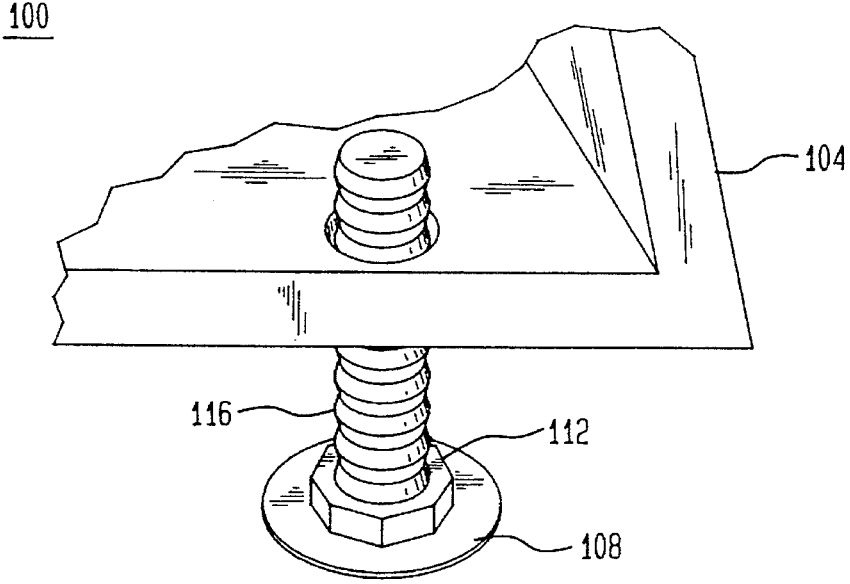
FIG. 1 A diagram illustrating a conventional leveler.
Figure 2:
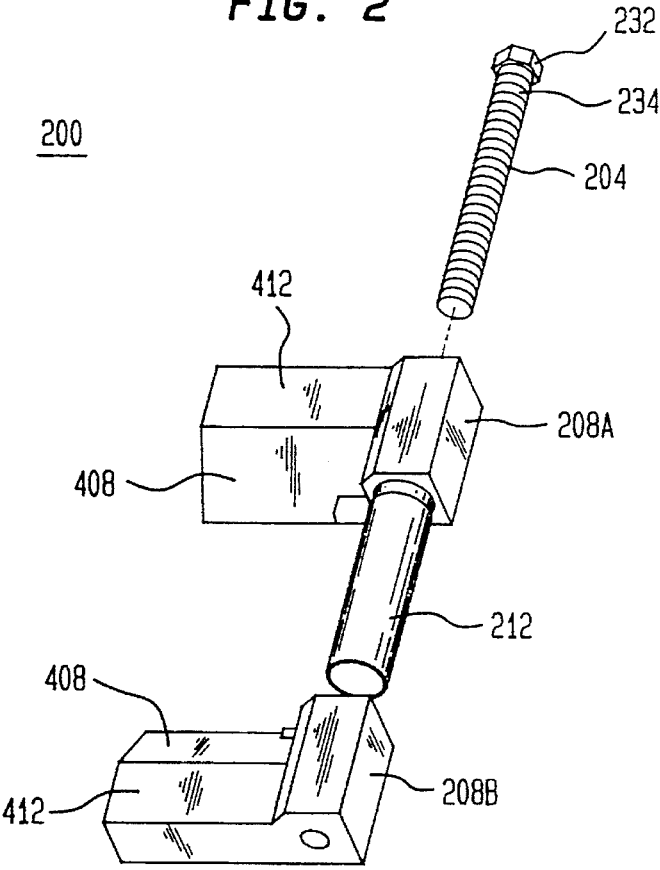
FIG. 2 An exploded view of the leveler according to one embodiment of the invention.

The present invention is directed to a leveler for leveling an enclosure or other piece of equipment that is supported by one or more wheels or casters. FIG. 2 is a diagram illustrating an exploded view of one embodiment of the leveler. Referring now to FIG. 2, leveler 200 comprises a first wedge A, a second wedge 208B, a sleeve 212, and a bolt 204. First wedge 208A and second wedge 208B are referred to generically as wedge 208 and collectively as wedges 208. Bolt 204 includes a head 232 and a threaded portion 234. Threaded portion 234 extends at least part of the length of bolt 204.

Figure 4:
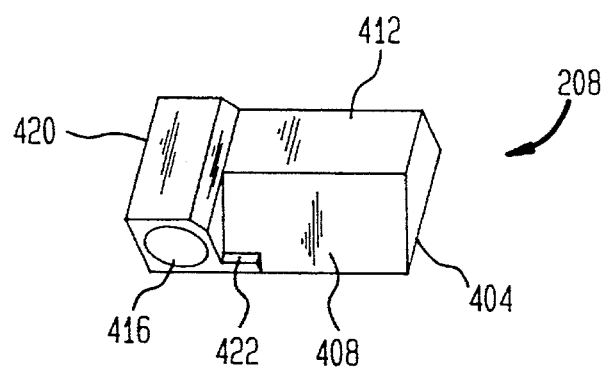
FIG. 4 A diagram illustrating-a wedge portion of a leveler.

FIG. 4 is a diagram illustrating with more particularity a wedge 208. Wedge 208 includes a flat bottom surface 404, a sloped surface 408, a top surface 412 and a coupling portion 420. A bore 416 is provided through mating portion 420 so that bolt 204 can be inserted therein. Bore 416 of at least one of wedges 208A, 208B is threaded so that wedges 208A, 208B can be brought together or spread apart by turning bolt 204 in bore 416.

Referring to FIGS. 2 and 4, sleeve 212 can be inserted into bore 416 of both wedges 208 for added stability of leveler 200. Sleeve 212 has an inner diameter sufficient to accommodate bolt 204. Where sleeve 212 is used, the diameter of bores 416 is adjusted accordingly for the part of each bore 416 into which sleeve 212 extends.

In one embodiment, bore 416 of wedge 208B has a first diameter to accommodate sleeve 212 and a second diameter to accommodate bolt 204. The second diameter is threaded so that when bolt 204 is turned, the distance between wedges 208A, 208B can be adjusted. For ease of manufacturing, in this embodiment, bore 416 of wedge 208A has a single diameter sufficient to accommodate sleeve 212.

In operation, leveler 200 is positioned on the floor so that first wedge 208A and second wedge 208B are positioned on either side of the wheel supporting the enclosure (e.g., the caster wheel). The wedges 208 are positioned such that the sloped surface 408 of each wedge is facing the rounded surface of the wheel. This is illustrated in FIG. 3.

Torque is applied to bolt 204 to turn bolt 204 into bolt hole 4 16. Turning bolt 204 in one direction causes first wedge 208A and second wedge 208B to move closer together. Turning bolt 204 the opposite direction causes first wedge 208A and second wedge 208B to separate from one another. To lift an enclosure, bolt 204 is turned so that wedges 208 come together under the rolling surface of the wheel. As wedges 208 are brought closer together, wheel 304 travels up sloped surfaces 408 of the wedges 208. As this occurs, wheel 304 is lifted off of floor 312 on which it previously rested. It should be noted that the floor could be any surface such as a laboratory, warehouse, plant, or shop floor; a truck or trailer bed; or any other surface on which enclosures can rest.

Figure 3:
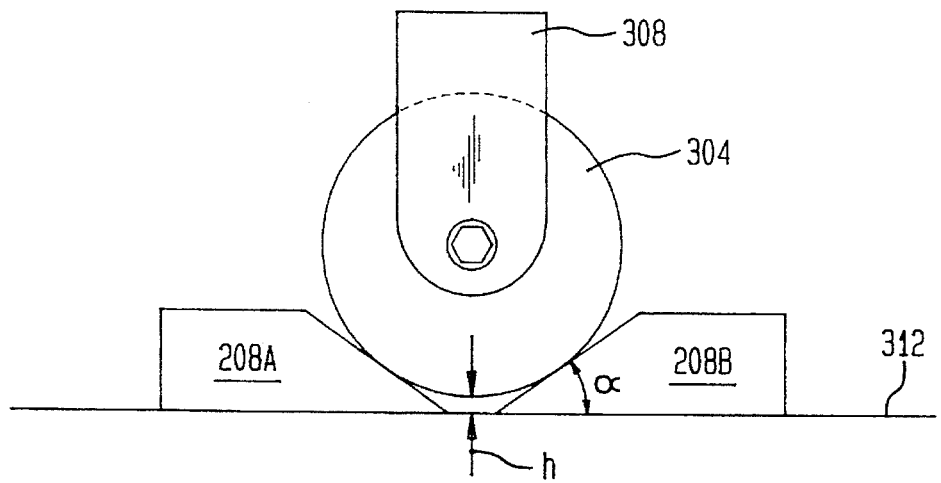
FIG. 3 A diagram illustrating a leveler lifting a wheel off of a floor.

As shown in FIG. 3, first wedge 208A and second wedge 208B have been brought together under the rolling surface of wheel 304 such that wheel 304 is elevated above floor 312. The spacing between wedge 208A and wedge 208B can be adjusted to thereby adjust the height h of wheel 304 above floor 312. Each leveler 200 of an enclosure can be adjusted in this manner such that the enclosure supported by each wheel 304 is level and/or is aligned with other adjacent enclosures.

Although the embodiment discussed above uses a bolt 204 to adjust the distance between wedges 208, it would be apparent to a person skilled in the relevant art that alternative mating devices can be used as well. For example a lever actuated ratchet mechanism could be used to bring wedges 208 closer together. As a further example, hydraulic or air pressurized means could be employed to adjust the spacing between wedges 308.

Referring now to FIGS. 3 and 4, a stop 422 is provided to separate wheel 304 from mating portion 420 of wedge 208. Stop 422 limits the range of leveler 200 so that housing 308 to which wheel 304 is mounted does not rest on the top surface.

Wedges 208 can be machined or cast depending on the application and the quantity desired. In a preferred embodiment, wedges are cast using a zinc aluminum alloy. Although not illustrated, the cast wedges have an internal cavity such that uniform wall thickness can be maintained during casting. This thickness is preferably 0.150 inches. Ribs can be provided to the walls during the casting process for additional strength.

In an alternative embodiment, wedges 208 are machined using aluminum. It should be noted that alternative materials can be used for the cast wedges 208.

In a preferred embodiment, bolt 204 is a one-half-inch diameter bolt made of steel with a zinc plating. Similarly sleeve 212 is made of steel with a zinc plating. Again, bolt 204 and sleeve 212 can be manufactured using other materials depending on the strength needed and/or the environment in which the invention is to be implemented.

In a preferred embodiment, the angle $\alpha$ (illustrated in FIG. 3) of slopped surface 408 is approximately 35°. Steeper angles could be used if more height is desired between wheel 304 and floor 312. However, a steeper angle results in less sensitivity of adjustment and increases the force required to raise wheel 304 a given height h.

Figure 5:
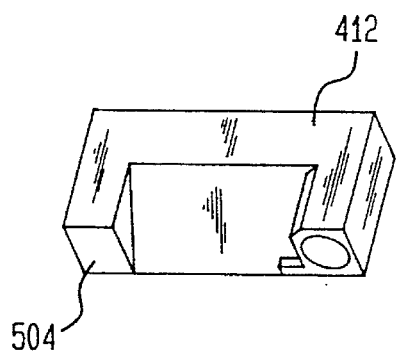
FIG. 5 A diagram illustrating an alternative embodiment of the leveler.

It should be further noted that the shape of wedge 408 could be altered without altering its functionality. For example, the corners of wedge 208 could be rounded. Additionally, top surface 412 of the wedge 208 and its mating portion 420 could be a planar surface as opposed to the bi-level surface illustrated in FIG. 4. The planar surface embodiment is illustrated in FIG. 5. FIG. 5 also illustrates a block portion 504. Block portion 504 can be included to keep a leveler 200 from being inadvertently knocked out from under wheel 304 once wheel 304 is raised.

Some commercially available casters offer shock and vibration absorbing characteristics. If such a caster is provided, the leveler 200 allows the shock and vibration absorbing characteristics of such a caster to be utilized in conjunction with the leveler 200. This is a distinct advantage over the conventional leveler. With the conventional leveler, enclosure 104 is supported independent of the caster and, in fact, the caster provides no support when the conventional leveler 100 is lowered. Thus, shock and vibration absorbing characteristics of the caster would be rendered useless with conventional leveler 100.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A leveler comprising:

a first wedge member, having a mating portion with a bore and a first sloped surface;

a second wedge member, facing said first wedge member and having a mating portion with a bore and a sloped surface;

a mating device, extending through said bore of said first wedge and at least partially into said bore of said second wedge, wherein adjustment of said mating device adjusts the proximity of said first wedge with respect to said second wedge; and a sleeve inserted within said bores of said first and second wedge members.

2. A leveler for lifting and supporting a wheel above a support surface, comprising:

a first wedge member configured to be interposed between a rolling surface of the wheel and the support surface;

an opposing wedge member configured to be interposed between a rolling surface of the wheel and the support surface on the opposite side of the wheel from said first wedge member; and mating means, coupled to said first wedge member and said opposing wedge member, for drawing said wedge members together and lifting the wheel above the support surface said mating means comprising, a first mating portion, coupled to said first wedge member and having a bore, a second mating portion, coupled to said opposing wedge member and having a bore, a sleeve inserted within said bores of said first and second wedge members, and a mating device, extending through said sleeve, said bore of said first mating portion and at least partially through said bore of said second mating portion, wherein adjustment of said mating device adjusts the height of the said rolling surface of the wheel above the support surface.

3. The leveler of claim 2, wherein said mating device is a bolt having a threaded portion and a head.

4. A leveler, comprising:

a first wedge member, having a mating portion with a bore and a first sloped surface;

a second wedge member, facing said first wedge member and having a mating portion with a bore and a sloped surface;

a sleeve inserted within said bores of said first and second wedge members; and a mating device, extending through said sleeve, said bore of said first wedge and at least partially into said bore of said second wedge, wherein adjustment of said mating device adjusts the proximity of said first wedge with respect to said second wedge.

5. The leveler of claim 4, wherein said sloped surfaces of said first and second wedge members have a substantially linear slope.

6. The leveler of claim 4, wherein at least one of said sloped surfaces of said first and second wedge members has a non-linear slope.

7. The leveler of claim 4, wherein said mating device is a bolt having a threaded portion and a head.

8. A device for adjusting the height of a wheel above a floor, comprising:

a first wedge, having a mating portion with a bore and a first sloped surface;

a second wedge, having a mating portion with a bore and a second sloped surface;

a mating device, extending through said bore of said first wedge and at least partially into said bore of said second wedge; and a sleeve inserted within said bores, coaxial with and around said mating device, wherein adjustment of said mating device causes said sloped surfaces of said wedges to travel under the rolling surface of the wheel to lift the wheel above the floor.

9. The device of claim 8, wherein said bore of said second wedge is at least partially threaded and said mating device is a bolt having a threaded portion and a head.

* * * * *